(12) United States Patent
Huang

(10) Patent No.: US 8,135,404 B2
(45) Date of Patent: Mar. 13, 2012

(54) APPARATUS, SYSTEM, AND METHODS FOR HANDLING ATTACH PROCEDURE IN MOBILE COMMUNICATION SYSTEM

(75) Inventor: Jen-Sheng Huang, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 348 days.

(21) Appl. No.: 12/465,824

(22) Filed: May 14, 2009

(65) Prior Publication Data

US 2010/0081393 A1 Apr. 1, 2010

Related U.S. Application Data

(60) Provisional application No. 61/101,147, filed on Sep. 29, 2008.

(51) Int. Cl.
*H04W 4/00* (2009.01)
(52) U.S. Cl. ...................... 455/435.1; 455/411
(58) Field of Classification Search ............... 455/435.1, 455/411
See application file for complete search history.

(56) References Cited

U.S. PATENT DOCUMENTS

| 7,346,348 B1 * | 3/2008 | Gazzard et al. | 455/432.3 |
| 2006/0187933 A1 * | 8/2006 | Yi | 370/395.2 |
| 2007/0243885 A1 * | 10/2007 | Shim | 455/456.2 |

* cited by examiner

*Primary Examiner* — Steven Lim
(74) *Attorney, Agent, or Firm* — Thomas|Kayden

(57) ABSTRACT

A user equipment for handling an attach procedure with a service network is provided. The user equipment comprises a wireless module transmitting an attach request message to the service network and receiving an attach accept message replied to the attach request message from the service network, and a controller determining whether to accept the attach accept message, sending an attach complete message, via the wireless module, to the service network in response to the attach accept message being accepted, and resending the attach request message, via the wireless module, to the service network in response to the attach accept message not being accepted.

20 Claims, 4 Drawing Sheets

APPARATUS, SYSTEM, AND METHODS FOR HANDLING ATTACH PROCEDURE IN MOBILE COMMUNICATION SYSTEM

CROSS REFERENCE TO RELATED APPLICATIONS

This Application claims priority of U.S. Provisional Application No. 61/101,147, filed Sep. 29, 2008.

BACKGROUND OF THE INVENTION

1. Field of the Invention

The invention generally relates to handling an attach procedure, and more particularly, to methods, apparatus, and system for handling an attach procedure in a mobile communication system environment.

2. Description of the Related Art

In a typical mobile communication system environment, a mobile user equipment (UE) communicates with one or more mobile communication systems via the radio access networks of the mobile communication systems. A UE comprises various types of equipment such as a mobile telephone (also known as cellular or cell phone), a laptop with wireless communication capability, a personal digital assistant (PDA) etc. The equipment may be portable, handheld, pocket-sized, and installed in a vehicle etc and communicate voice and/or data signals with the radio access network.

A universal mobile telecommunications system (UMTS) is a third generation mobile communication system that has evolved from the Global System for Mobile communications (GSM) system. The UMTS is a European standard which aims to provide better mobile communication services based on the GSM core network and wideband code division multiple access (W-CDMA) technology. Although UMTS delivers high data transfer rates, wireless data usage is expected to increase significantly over the next few years. For this reason, concepts for UMTS Long Term Evolution (LTE) have been proposed and the objective is to further improve UMTS to achieve high-data-rates, low-latency and packet-optimized radio access technology. The improved UMTS technology is called Evolved Universal Terrestrial Radio Access (E-UTRA) and the system employing the E-UTRA technology is called an Evolved Packet System (EPS).

For a UE, which complies with the 3GPP specifications for the E-UTRA protocol, the 3GPP TS 24.301 specification, v.1.0.0, referred to herein as the 24.301 specification, addresses the subject of the Non-Access-Stratum (NAS) protocol requirements for the EPS and the UE.

After the UE is powered on and connects to the EPS, it will need to perform an attach procedure to register itself to the EPS so that it can start a packet data session over the EPS. As illustrated in FIG. 1, the attach procedure starts by the UE sending an ATTACH REQUEST message to the EPS (step S101). The ATTACH REQUEST message may be sent combined with a PDN CONNECTIVITY REQUEST message indicating that the UE wishes to start a packet data session with the EPS. When the EPS receives the ATTACH REQUEST message, it authenticates the UE, checks if the UE is authorized to have access to packet data services, and performs a security mode control procedure to activate the encryption on subsequent messages (step S102). If none of the checks fails, the EPS accepts the attach request by sending an ATTACH ACCEPT message to the UE. The ATTACH ACCEPT message may be sent combined with an ACTIVATE DEFAULT EPS BEARER CONTEXT REQUEST message if the PDN CONNECTIVITY REQUEST message is found in the ATTACH REQUEST message (step S103). The ACTIVATE DEFAULT EPS BEARER CONTEXT REQUEST message contains the configuration used to activate the default bearer for the packet data session. When the UE receives the ATTACH ACCEPT message, it checks the ACTIVATE DEFAULT EPS BEARER CONTEXT REQUEST message to see if the configuration within is acceptable. If the UE accepts the configuration specified in the ACTIVATE DEFAULT EPS BEARER CONTEXT REQUEST message, it applies the configuration, resets the counters associated with the attach procedure, including the attach attempt counter and the tracking area updating attempt counter, enters the EMM-REGISTERED state, and sets the EPS update status to EU1 UPDATED (step S104). The UE then responds to the EPS with an ATTACH COMPLETE message to acknowledge that it has received and accepted the ATTACH ACCEPT message (step S105). The ATTACH COMPLETE message may be sent combined with an ACTIVATE DEFAULT EPS BEARER CONTEXT ACCEPT message indicating that the UE has accepted the configuration of the default bearer from the ACTIVATE DEFAULT EPS BEARER CONTEXT REQUEST message. At last, the EPS receives the ATTACH COMPLETE message combined with the ACTIVATE DEFAULT EPS BEARER CONTEXT ACCEPT message and the attach procedure ends successfully.

BRIEF SUMMARY OF THE INVENTION

Accordingly, embodiments of the invention provide an apparatus, system, and methods for handling attach procedure in a mobile communication system. In one aspect of the invention, a user equipment handling an attach procedure with a service network is provided. The user equipment comprises a wireless module and a controller. The wireless module transmits an attach request message to the service network and receives an attach accept message replied to the attach request message from the service network. The controller determines whether to accept the attach accept message, sends an attach complete message, via the wireless module, to the service network in response to the attach accept message being accepted, and resends the attach request message, via the wireless module, to the service network in response to the attach accept message not being accepted.

In another aspect of the invention, a method for a user equipment to handle an attach procedure with a service network is provided. The method comprises sending an attach request message to the service network, receiving an attach accept message replied to the attach request message from the service network, determining whether to accept the attach accept message, and sending an attach complete message to the service network in response to the attach accept message being accepted, and resending the attach request message to the service network in response to the attach accept message not being accepted.

In another aspect of the invention, a service network for handling an attach procedure with a user equipment is provided. The service network comprises a radio access network and a control node. The radio access network receives an attach request message from the user equipment, sends a first attach accept message to the user equipment in response to the attach request message, and receives a response message from the user equipment. The control node determines that the attach procedure has ended successfully in response to the response message being an attach complete message, aborts the attach procedure and initiates a new attach procedure by sending a second attach accept message, via the radio access network, to the user equipment in response to the response message being the attach request message resent by the user equipment, and aborts the attach procedure and sends a detach accept message, via the radio access network, to the user equipment in response to the response message being a detach request message.

In another aspect of the invention, a method for a service network to handle an attach procedure with a user equipment is provided. The method comprises receiving an attach request message from the user equipment, sending a first attach accept message to the user equipment in response to the attach request message, receiving a response message from the user equipment, aborting the attach procedure and initiating a new attach procedure by sending a second attach accept message to the user equipment in response to the response message being the attach request message resent by the user equipment, and aborting the attach procedure and sending a detach accept message to the user equipment in response to the response message being a detach request message.

In another aspect of the invention, a mobile communication system for handling an attach procedure is provided. The mobile communication system comprises a user equipment and a service network. The user equipment sends an attach request message, receives a first attach accept message replied to the attach request message, determines whether to accept the first attach accept message, sends an attach complete message in response to the first attach accept message being accepted, and resends the attach request message in response to the first attach accept message not being accepted. The service network receives the attach request message, sends the first attach accept message in response to the attach request message, determines that the attach procedure has ended successfully upon receiving the attach complete message, and aborts the attach procedure and initiates a new attach procedure by sending a second attach accept message to the user equipment upon receiving the attach request message resent by the user equipment.

Other aspects and features of the present invention will become apparent to those ordinarily skilled in the art upon review of the following descriptions of specific embodiments of an apparatus, system, and methods for handling an attach procedure in an E-UTRA system environment.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. In order to give better examples, the embodiments described below are utilized in EPS environments. In addition, 3GPP specifications are used to teach the spirit of this invention but not used to limit the scope of the present invention.

There are situations where the UE may not accept the configuration specified in the ACTIVATE DEFAULT EPS BEARER CONTEXT REQUEST message. For instance, if the bearer resources of the UE are not sufficient enough to apply a required configuration, there may be semantic errors or syntactical errors in the configuration. Additionally, other situations specified in clause 6.4.1.4 of the 24.301 specification may also occur. If the UE does not accept the configuration, it requests a suitable or correct configuration from the EPS. Accordingly, the UE reinitiates the attach procedure. Yet, in accordance with clause 5.5.1.2.4 of the 24.301 specification, whenever the UE receives the ATTACH ACCEPT message combined with the ACTIVATE DEFAULT EPS BEARER CONTEXT REQUEST message, it resets the attach attempt counter and tracking area updating attempt counter, enters the EMM-REGISTERED state, sets the EPS update status to EU1 UPDATED, and applies the configuration specified in the ACTIVATE DEFAULT EPS BEARER CONTEXT REQUEST message. After, the UE sends an ATTACH COMPLETE message combined with the ACTIVATE DEFAULT EPS BEARER CONTEXT ACCEPT message to the EPS. Thus, since the clause 5.5.1.2.4 of the 24.301 specification completely ignores the situation when the UE does not accept the configuration specified in the ACTIVATE DEFAULT EPS BEARER CONTEXT REQUEST message, faulty handling of attach procedures by the UE and EPS may occur.

Figure 1:
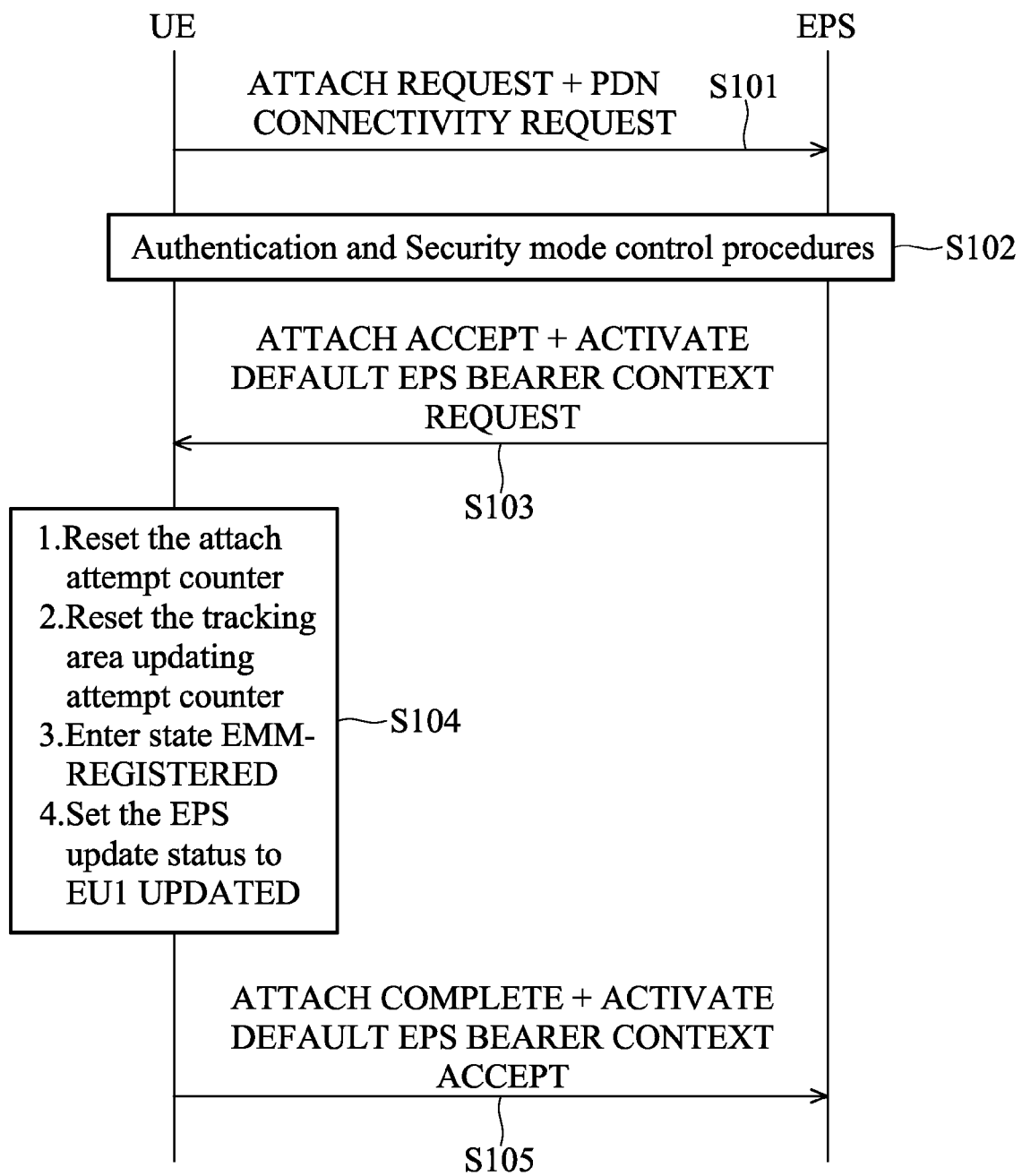
FIG. 1 is a message sequence chart illustrating a successful attach procedure in an EPS environment.
Figure 2:
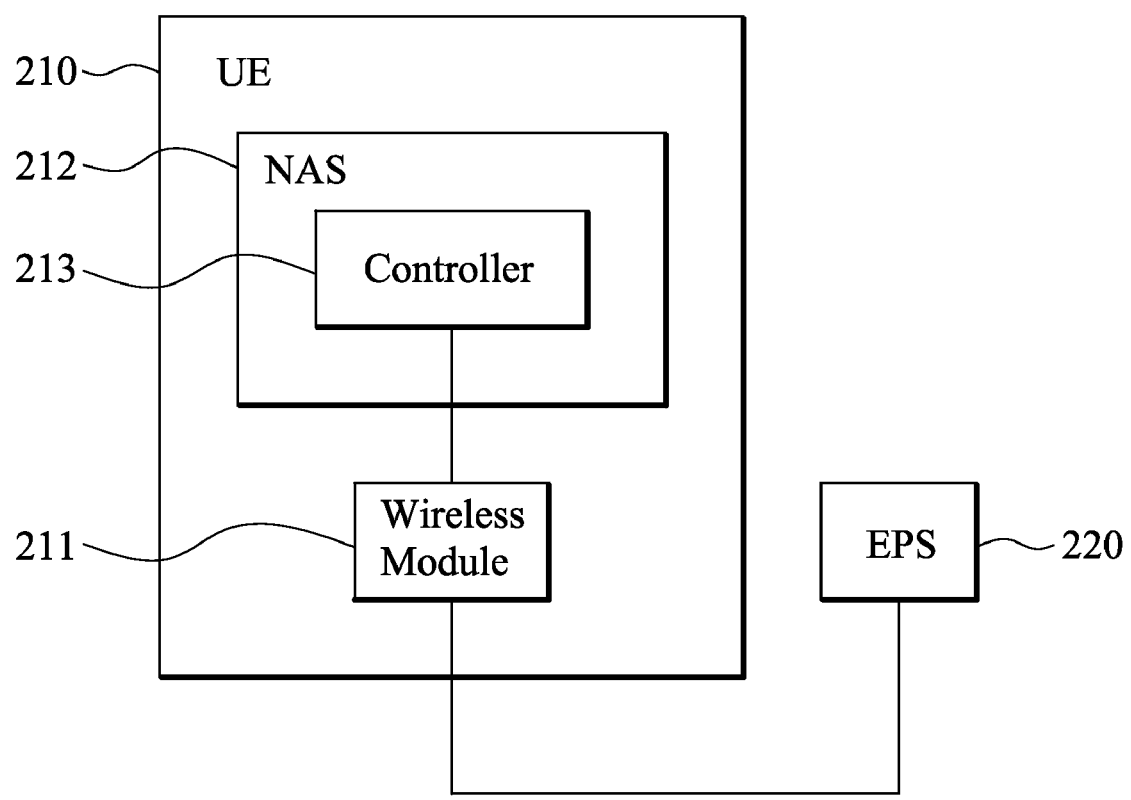
FIG. 2 is a block diagram illustrating a UE in accordance of an embodiment of this present invention.

FIG. 2 is a block diagram illustrating a UE in accordance of an embodiment of this present invention. The UE 210 has a wireless module 211 for receiving and transmitting messages propagated in radio frequency. The UE 210 also includes the NAS protocol stack 212, which is connected to receive and transmit messages from and to the EPS 220 via the wireless module 211. The connection between the NAS protocol stack 212 and the wireless module 211 may involve protocol stacks that are not shown in FIG. 2, such as the radio resource control (RRC) protocol stack, the radio link control (RLC) protocol stack, the medium access control (MAC) protocol stack, and the physical layer protocol stack. For implementation, any of the protocol stacks referred to in this specification may be realized by a combination of hardware and software. The NAS protocol stack 212 comprises a controller 213 for performing the NAS functions and handling an attach procedure. The operation of the controller 213 is explained in more detail in the following embodiments.

Figure 3:
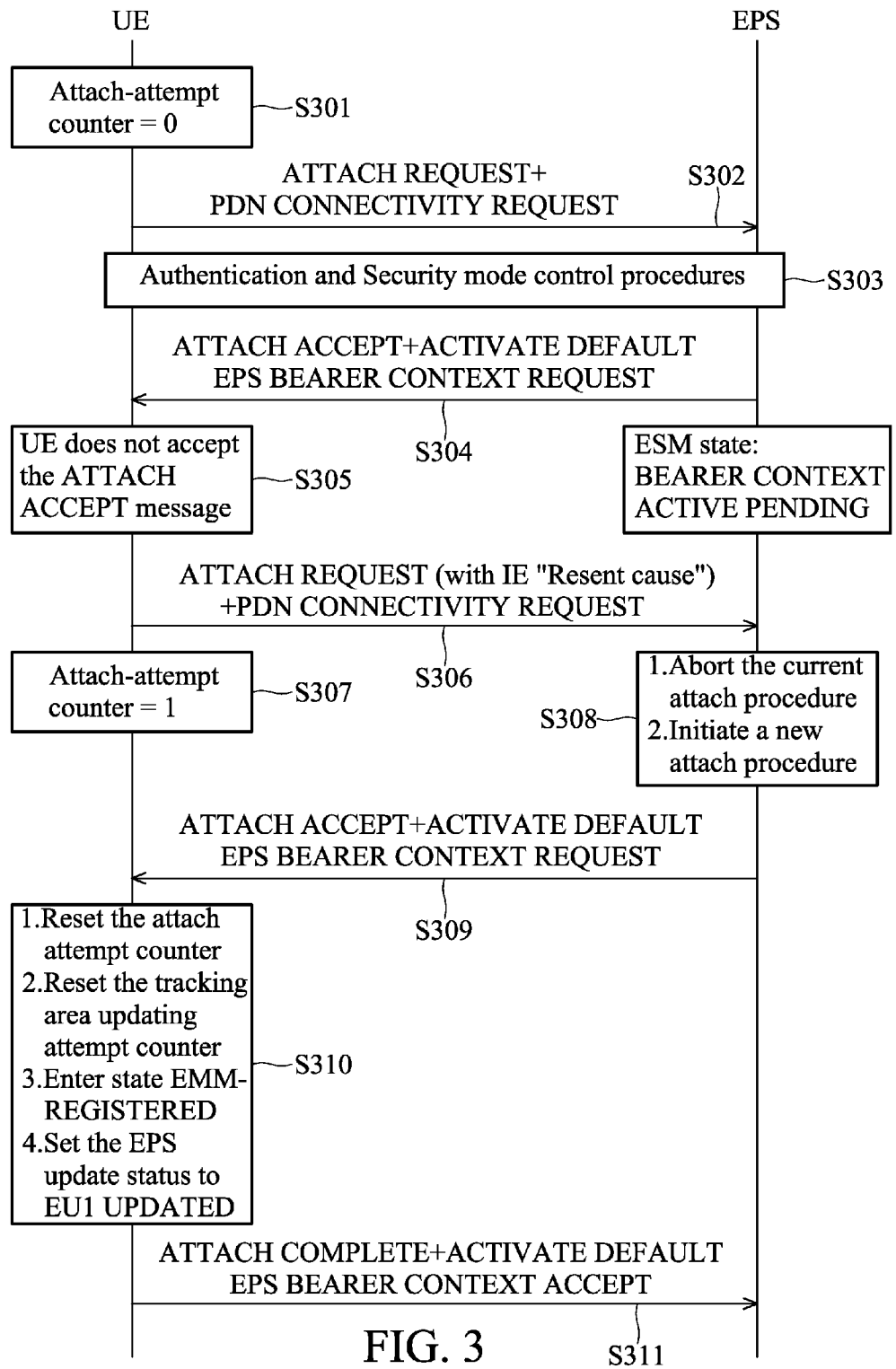
FIG. 3 is a message sequence chart illustrating the UE and EPS handling an attach procedure according to an embodiment of the invention.

FIG. 3 is a message sequence chart illustrating the UE and EPS handling an attach procedure according to an embodiment of the invention. During the attach procedure, the UE 210 maintains an attach attempt counter, referred to herein as a retry counter, to keep track of the number of retries allowed when the attach attempt is not successful. Initially, the retry counter is set to 0 (step S301). When the UE 210 wishes to register with the EPS 220 and start a packet data session with the EPS 220, the UE 210 initiates an attach procedure by sending an ATTACH REQUEST message, with a PDN CONNECTIVITY REQUEST message combined in it, to EPS 220 (step S302). After reception of the ATTACH REQUEST message, the EPS 220 performs the authentication procedure to check if the UE 210 is authorized, and the security mode control procedure to activate the encryption on the subsequent messages in the connection with UE 210 (step S303). If the procedures end normally, the EPS 220 sends an ATTACH ACCEPT message, with an ACTIVATE DEFAULT EPS BEARER CONTEXT REQUEST message combined in it, to the UE 210 (step S304). Upon reception of the ATTACH ACCEPT message by the wireless module 211, the controller 213 retrieves the ACTIVATE DEFAULT EPS BEARER CONTEXT REQUEST message and determines that the default EPS bearer context activation configuration in the ACTIVATE DEFAULT EPS BEARER CONTEXT REQUEST message is not acceptable due to the reasons as specified in clause 6.4.1.4 of the 24.301 specification (step S305). The UE 210 then checks to see if the retry counter is less than a predetermined number. If the retry counter is less than a predetermined number, the UE 210 resends the ATTACH REQUEST message combined with the PDN CONNECTIVITY REQUEST message (step S306). The resent ATTACH REQUEST message includes a resent cause (IE "Resent cause") indicating that the message is resent due to the previous ACTIVATE DEFAULT EPS BEARER CONTEXT REQUEST message being rejected by UE 210, and the ACTIVATE DEFAULT EPS BEARER CONTEXT REQUEST message includes an unaccepted cause (IE "ESM cause"). Upon resending the ATTACH REQUEST message, the UE 210 increments the retry counter by 1 (step S307). When the EPS 220 receives the resent the ATTACH REQUEST message, it checks to see if the ATTACH REQUEST message includes a resend cause. If the ATTACH REQUEST message includes a resend cause, the EPS 220 aborts the current attach procedure and initiates a new attach procedure (step S308) by sending a new ATTACH ACCEPT message combined with a new ACTIVATE DEFAULT EPS BEARER CONTEXT REQUEST message to the UE 210 (step S309). The configuration specified in the new ACTIVATE DEFAULT EPS BEARER CONTEXT REQUEST message is adjusted by EPS 220 according to the unaccepted cause. Since the configuration specified in the new ACTIVATE DEFAULT EPS BEARER CONTEXT REQUEST message is adjusted, the UE may accept the new ATTACH ACCEPT message and the new ACTIVATE DEFAULT EPS BEARER CONTEXT REQUEST message. After accepting the new ATTACH ACCEPT message, the UE 210 continues with resetting the attach attempt counter and tracking area updating attempt counter, entering an EMM-REGISTERED state, setting the EPS update status to EU1 UPDATED, and applying the configuration specified in the new ACTIVATE DEFAULT EPS BEARER CONTEXT REQUEST message (step S310). Afterward, the UE sends an ATTACH COMPLETE message combined with the ACTIVATE DEFAULT EPS BEARER CONTEXT ACCEPT message to the EPS (step S311). Once the EPS 220 receives the ATTACH COMPLETE message, the attach procedure ends successfully.

In other embodiments, the UE 210 may rejects the new ATTACH ACCEPT message again and thus the operations in step S305~S307 are repeated. In this case, step S305~S307 can be repeated, until the retry counter is greater than or equal to the predetermined number or the UE 210 accepts the new ATTACH ACCEPT message.

Figure 4:
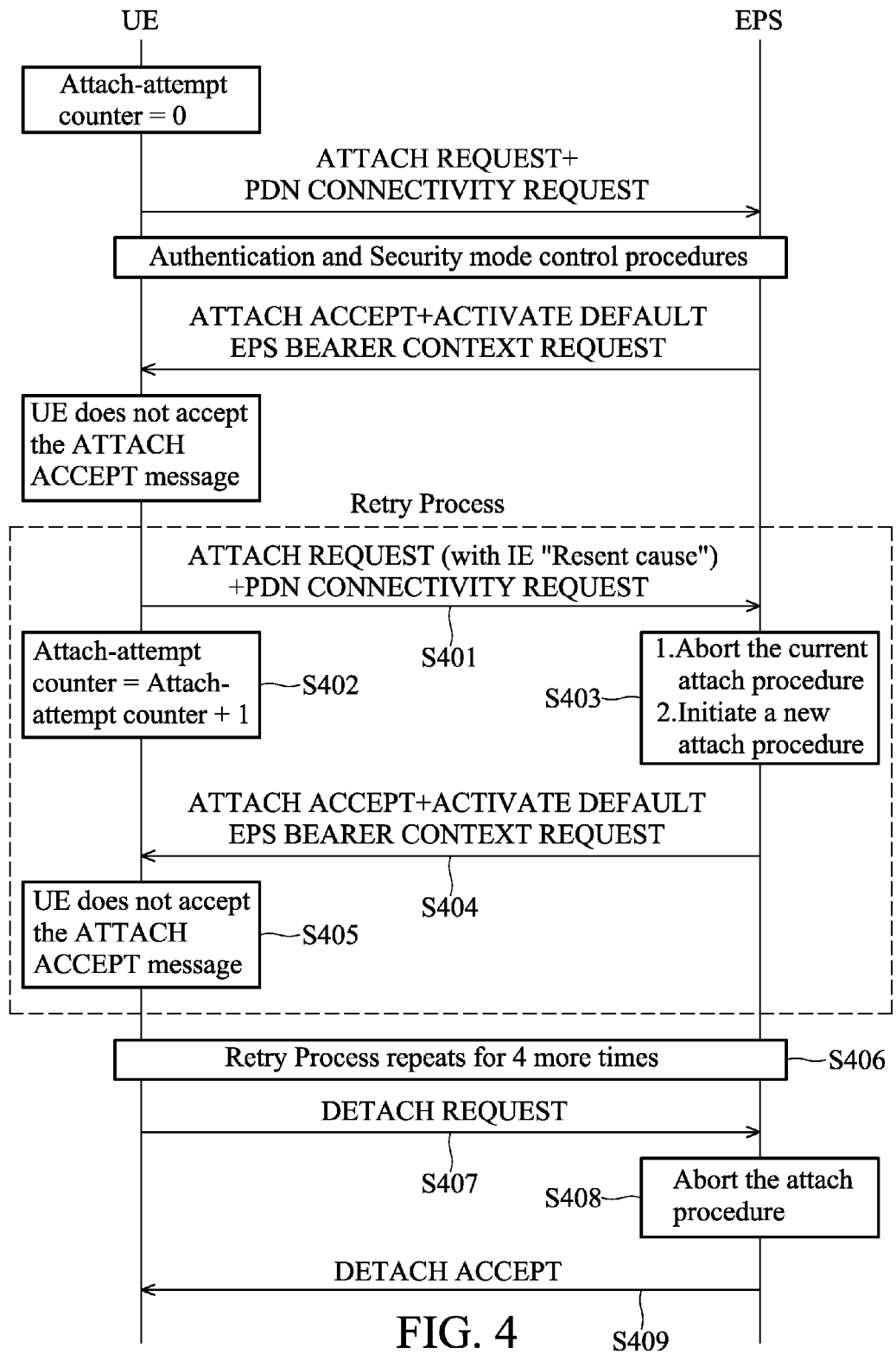
FIG. 4 is a message sequence chart illustrating the UE and EPS aborting an unaccepted attach procedure after a predetermined number of retries according to an embodiment of the invention.

FIG. 4 is a message sequence chart illustrating the UE and EPS aborting an unaccepted attach procedure after a predetermined number of retries according to an embodiment of the invention. During an attach procedure, the UE 210 carries out the retry process by resending the ATTACH REQUEST message with a resent cause (step S401), as depicted in FIG. 3, when not accepting the ATTACH ACCEPT message from the EPS 220. Upon resending the ATTACH REQUEST message, the UE 210 increments the retry counter by 1 (step S402). When the EPS 220 receives the resent ATTACH REQUEST message with the resent cause, it responds accordingly by aborting the current attach procedure and reinitiating a new attach procedure (step S403) by sending a new ATTACH ACCEPT message combined with a new ACTIVATE DEFAULT EPS BEARER CONTEXT REQUEST message to the UE 210 (step S404). If the UE 210 rejects the ATTACH ACCEPT message again (step S405), then the retry process (step S401~S404) repeats. The maximum number of retries can be any predetermined number, or 5 in this embodiment. If the retry process fails for 4 more times (step S406) which means the maximum number of retries has been reached, then the UE 210 aborts the attach procedure by sending a DETACH REQUEST message to the EPS 220 (step S407). Upon receiving the DETACH REQUEST message, the EPS 220 aborts the attach procedure (step S408) and responds by sending a DETACH ACCEPT message to the UE 210 (step S409). Afterward, the attach procedure ends by being considered as failed by both the UE 210 and the EPS 220.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A user equipment, handling an attach procedure with a service network, comprising:
   a wireless module transmitting an attach request message to the service network and receiving an attach accept message replied to the attach request message from the service network; and
   a controller determining whether to accept the attach accept message, sending an attach complete message, via the wireless module, to the service network in response to the attach accept message being accepted, and resending the attach request message, via the wireless module, to the service network in response to the attach accept message not being accepted.

2. The user equipment of claim 1, further comprising a retry counter, wherein the retry counter is initialized to 0 before starting the attach procedure, increased upon resending the attach request message, and reset when the attach procedure ends.

3. The user equipment of claim 2, wherein the attach request message is resent with a resent cause when the retry counter is less than a predetermined number.

4. The user equipment of claim 3, wherein the controller further determines whether the retry counter is less than the predetermined number, and sends a detach request message, via the wireless module, to the service network in response of that the retry counter is greater than or equal to the predetermined number.

5. A method for a user equipment to handle an attach procedure with a service network, comprising:
   sending an attach request message to the service network;
   receiving an attach accept message replied to the attach request message from the service network;
   determining whether to accept the attach accept message;
   sending an attach complete message to the service network in response to the attach accept message being accepted; and
   resending the attach request message to the service network in response to the attach accept message not being accepted.

6. The method of claim 5, further comprises initializing a retry counter to 0 before starting the attach procedure, increasing the retry counter upon resending the attach request message, and resetting the retry counter when the attach procedure ends.

7. The method of claim 6, wherein the attach request message is resent with a resent cause when the retry counter is less than a predetermined number.

8. The method of claim 7, further comprises determining whether the retry counter is less than the predetermined number, and sending a detach message to the service network in response of that the retry counter is greater than or equal to the predetermined number.

9. A service network, handling an attach procedure with a user equipment, comprising:
 a radio access network receiving an attach request message from the user equipment, sending a first attach accept message to the user equipment in response to the attach request message, and receiving a response message from the user equipment; and
 a control node determining that the attach procedure has ended successfully in response to the response message being an attach complete message, aborting the attach procedure and initiating a new attach procedure by sending a second attach accept message, via the radio access network, to the user equipment in response to the response message being the attach request message resent by the user equipment, and aborting the attach procedure and sending a detach accept message, via the radio access network, to the user equipment in response to the response message being a detach request message.

10. The service network of claim 9, wherein the attach complete message is sent upon the first attach accept message being accepted by the user equipment.

11. The service network of claim 9, wherein the attach request message resent by the user equipment is resent with a resent cause upon the first attach accept message not being accepted by the user equipment.

12. The service network of claim 9, wherein the detach request message is sent, upon the first attach accept message not being accepted by the user equipment and the number of resending the attach request message being greater than or equal to a predetermined number.

13. A method for a service network to handle an attach procedure with a user equipment, comprising:
 receiving an attach request message from the user equipment;
 sending a first attach accept message to the user equipment in response to the attach request message;
 receiving a response message from the user equipment;
 determining that the attach procedure has ended successfully in response to the response message being an attach complete message;
 aborting the attach procedure and initiating a new attach procedure by sending a second attach accept message to the user equipment in response to the response message being the attach request message resent by the user equipment; and
 aborting the attach procedure and sending a detach accept message to the user equipment in response to the response message being a detach request message.

14. The method of claim 13, wherein the attach complete message is sent upon the first attach accept message being accepted by the user equipment.

15. The method of claim 13, wherein the attach request message resent by the user equipment is resent with a resent cause upon the first attach accept message not being accepted by the user equipment.

16. The method of claim 13, wherein the detach request message is sent, upon the first attach accept message not being accepted by the user equipment and the number of resending the attach request message being greater than or equal to a predetermined number.

17. A mobile communication system, handling an attach procedure, comprising:
 a user equipment sending an attach request message, receiving a first attach accept message replied to the attach request message, determining whether to accept the first attach accept message, sending an attach complete message in response to the first attach accept message being accepted, and resending the attach request message in response to the first attach accept message not being accepted; and
 a service network receiving the attach request message, sending the first attach accept message to the user equipment in response to the attach request message, determining that the attach procedure has ended successfully upon receiving the attach complete message, and aborting the attach procedure and initiating a new attach procedure by sending a second attach accept message to the user equipment upon receiving the attach request message resent by the user equipment.

18. The mobile communication system of claim 17, wherein the attach request message resent by the user equipment is resent with a resent cause when the number of resending the attach request message is less than a predetermined number.

19. The mobile communication system of claim 18, wherein the user equipment further determines whether the number of resending the attach request message is less than the predetermined number, and sends a detach request message to the service network in response of that the number of resending the attach request message is greater than or equal to the predetermined number.

20. The mobile communication system of claim 19, wherein the service network further aborts the attach procedure and sends a detach accept message to the user equipment upon receiving the detach request message.

* * * * *